United States Patent [19]
Galich

[11] 3,825,360
[45] July 23, 1974

[54] JOINT APPARATUS FOR SECTIONED SKIS OR THE LIKE

[76] Inventor: Thomas Patrick Galich, 33552 Palo Alto, Dana Point, Calif. 92629

[22] Filed: June 30, 1972

[21] Appl. No.: 267,923

Related U.S. Application Data
[63] Continuation-in-part of Ser. No. 167,610, July 30, 1971, abandoned.

[52] U.S. Cl.......... 403/294, 280/11.13 K, 403/316, 403/319
[51] Int. Cl............................................ F16b 12/22
[58] Field of Search............280/11.13 K, 11.13 L, 280/11.13 M; 287/20.92 T, 20.92 K, 287/20.92 J, 20.92 W, 20.92 C, 189,36 D, 287/64, 103 R, 2, 20.924, 20.926, 20.927; 52/586, 726; 312/348; 24/201 LP

[56] References Cited
UNITED STATES PATENTS

| | | | |
|---|---|---|---|
| 1,655,766 | 1/1928 | Hildebrant | 287/103 R |
| 2,277,281 | 3/1942 | Vinton | 280/11.13 K |
| 2,520,221 | 8/1950 | Ponty | 287/20.927 |
| 2,648,543 | 8/1953 | Grabowski | 280/11.13 |
| 3,091,844 | 6/1963 | Laine | 287/64 |
| 3,104,888 | 9/1963 | Day et al | 280/11.13 K |
| 3,355,196 | 11/1967 | Harrison | 287/20.92 T |

FOREIGN PATENTS OR APPLICATIONS

| | | | |
|---|---|---|---|
| 1,032,398 | 7/1953 | France | 287/20.92 T |
| 162,755 | 9/1948 | Austria | 280/11.13 K |
| 407,166 | 10/1942 | Italy | 280/11.13 K |

*Primary Examiner*—Jordan Franklin
*Assistant Examiner*—Conrad L. Berman
*Attorney, Agent, or Firm*—Henry M. Bissell

[57] ABSTRACT

An interconnecting joint for joining together adjacent ends of a pair of planar members such as portions to make up a ski. Key interlocks are formed at the ends of the members which are joined together for interlocking the members and preventing longitudinal separation thereof. Slotted portions are formed in the members for positioning an insert, with a portion of the insert mounted in each of the planar members and secured in place by easily removable retainers. The insert provides additional support for the joint and prevents undesired transverse flexing of the members at the joint. The joint provides a generally unitary structure having the same cross-sectional dimensions as each of the members at the joint with no protruding portions. Moreover, the joint allows ready separation of the planar members to permit packing of the members for transportation in a more compact array.

14 Claims, 12 Drawing Figures

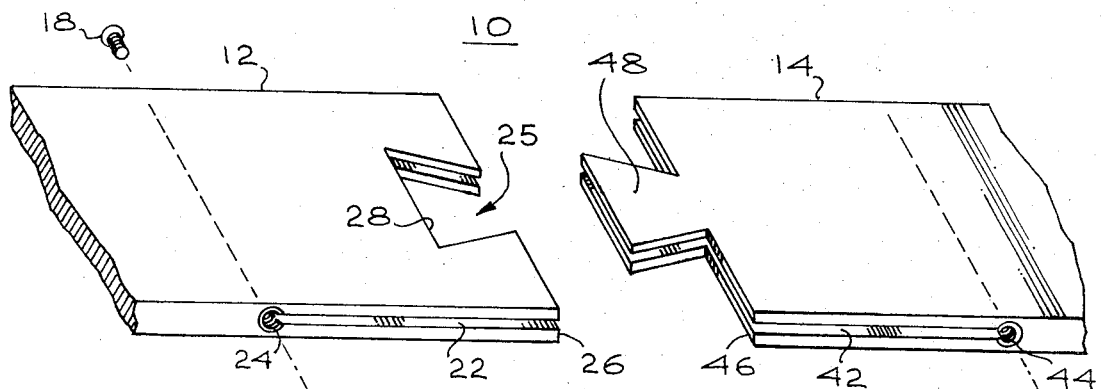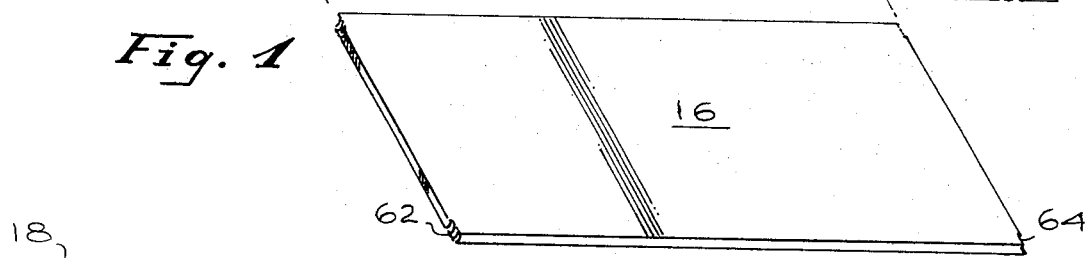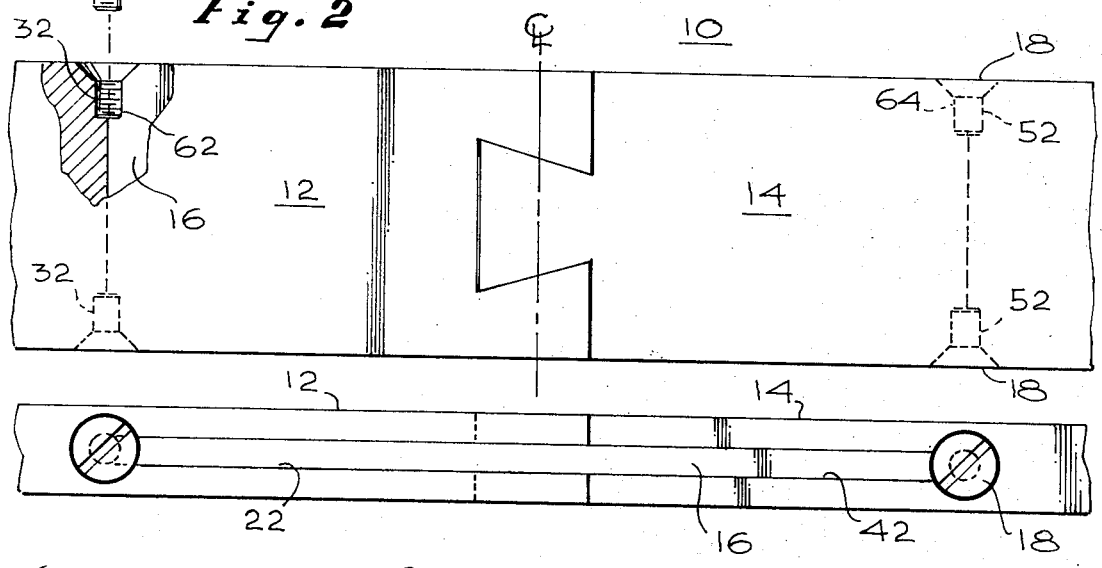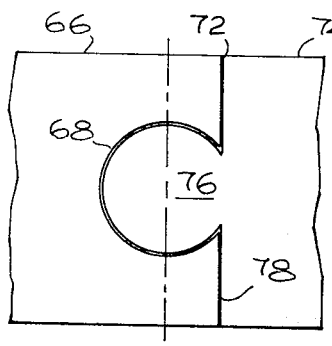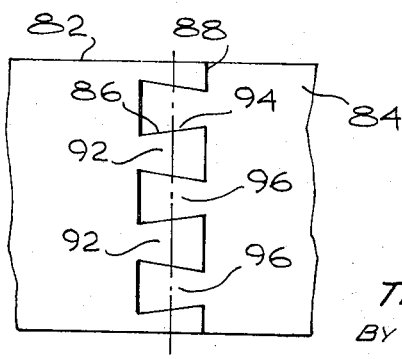

INVENTOR
THOMAS P. GALICH
BY Henry M. Bissell
ATTORNEY

JOINT APPARATUS FOR SECTIONED SKIS OR THE LIKE

This application is a continuation in-part of my co-pending application Ser. No. 167,610, filed July 30, 1971, now abandoned.

BACKGROUND OF THE INVENTION

1. Field of the Invention

This invention relates in general to interconnecting joints for relatively long and thin planar sections, and more particularly, to a collapsible element such as a sectioned ski having a rigid joint formed when the sections are assembled.

2. Description of the Prior Art

Skis, although graceful in use, are most cumbersome when it comes to transporting them to and from the ski resort. Airlines provide special shipping cartons and special car-top carriers are needed to transport the 6- to-7 foot items which are only a few inches in cross-sectional dimension. Development of sectioned skis which may be assembled for use at the skiing area has been attempted for many years in an effort to overcome the problem of transporting the skis to the ski area in a bulky, hard-to-handle package. By breaking down each ski into two or three sections, the skis can be conveniently packed and transported along with other luggage and belongings.

The principal problem with related prior art devices has been the difficulty of developing a suitable joining mechanism which is effective in utilization and yet not so cumbersome as to mar the appearance and performance of the skis. Conventional sectioned skis typically are joined together by an externally fashioned mechanism which generally protrudes from the ski itself. Such a mechanism can be a nut and bolt or screw extending from the ski. Alternatively, a latching device is provided to interconnect the two portions of the ski. Typically such skis are formed in a tongue and groove fashion with the device operably utilized to interconnect the two sections.

Prior art sectioned joints have been unsuccessful in that the section securing devices typically would protrude from the ski itself. In such a position, it could be prematurely released during the ski run or could be sheared off or otherwise fail during use. Moreover, the interconnecting joint itself was subject to failure due to stresses formed at the joint as well as inadequate means used to secure the sections together. The Noguchi U.S. Pat. No. 3,439,928 is an example of the prior art in which a jointed ski has been developed but never found acceptance on the market. Insofar as is known, no one so far has been able to develop a joint for a ski which is strong enough to perform under normal stress and yet blend into the ski when assembled so as to be acceptable to purchasers and users. Moreover, prior art joints for skis have been unable to match the performance of the unjointed skis so that the difference in performance due to the non-uniformity of the structure at the joint is unnoticeable in use. Accordingly, such prior art developments have not been really practical.

In order to overcome the attendant disadvantages of prior art sectioned joints, the present invention provides a level of strength which does not degrade the normal performance or strength of the ski. The joint of the invention is of such strength that any failure of the ski under stress is more likely to occur elsewhere than at the joint. Moreover, the joint is such that the ski or other sectioned member retains its general overall cross-sectioned shape and dimensions while elements used to form the joint do not extend from the ski surface itself.

SUMMARY OF THE INVENTION

In brief, the invention comprises an interconnecting joint for joining together one of the ends of each of pair of planar members. Keying means are formed in the planar members for interlocking the members and preventing longitudinal separation thereof. Slotted sections are formed in the members into which an insert is mounted. The insert provides additional support for the members and prevents undesired transverse flexing of the members. The resultant joint provides a generally unitary structure whose outer dimensions approximate that of each of the planar members in the vicinity of the joint. The joint allows ready separation of the two planar members for simplified transportation of the members, as well as providing a rigid structure having no protruding portions when assembled. Moreover, means such as one or more retainers may be provided at the joint to lock the insert in place, thus preventing edgewise movement of the insert relative to the planar members. Further, the key number may have various alternative interlocking shapes.

As an alternative the joint may be fabricated for assembly without the insert and slot therefor, the function of holding the planar member keying means interlocked by preventing relative vertical movement toward disassembly being performed by any suitable retaining means, such as a screw threaded into a hole embracing two of the keying means of the respective planar members. Removal of the screw would permit release of the keying means relative to one another and disassembly of the two members in the manner already indicated.

In another particular arrangement in accordance with the invention, the joint members comprise a pair of mating interlocking configurations adapted to fit together in the manner already described. However, in this arrangement along the underside of the ski one part of the joint provides an overlap extending across part of the other side of the joint, thus providing a ski surface with a totally closed face except for the fine trnsverse line which marks the juncture along the bottom of the ski. This arrangement is particularly applicable for use in the modification of pre-existing skis whether during initial fabrication or upon order by the owner after purchase. For this purpose, each of the two interlocking members is provided with a tongue-shaped extension designed to extend back into a pocket of matching shape and dimension which is hollowed out in the associated split ski end. In this fashion, the interlocking insert may be secured within the hollowed-out pocket of the ski by means of epoxy or other suitable adhesive which renders the ski in the vicinity of the joint as strong or stronger than before modification to include the joint. Moreover, a further advantage is realized from such a configuration by virtue of the base or support provided by the extended tongue of the joint for retaining screws which are used to fasten the ski bindings on the ski. Such securing of the ski bindings to the ski has become a particular problem in recent years with the advent of foam-filled or honeycomb laminated skis, wherein the process for attaching the ski bindings comprises drilling a larger hole than is needed for the screw, filling the hole with epoxy and then screwing a sheet metal screw into the epoxy. In such arrangements, there has been noted a tendency of the sheet metal screws to pull loose on occasion under even moderate stress. However, where the retaining screws are screwed into the metal insert of the joint hardware of the present invention, there is no danger of their pulling loose and the problem just described is thereby circumvented.

In accordance with an aspect of the invention, one of the joint members may be drilled in the longitudinal direction of the ski and a retainer element may be inserted therein. Preferably this element is of the spring-ball type in the form of a hollow pin, having at one end a small ball which may be depressed against a coiled spring within the hollow pin. A locking insert is employed with the spring ball detent, having four symmetrically positioned notches so adapted that one of the notches will receive the spring-loaded ball of the detent element when the insert is in place, and without any need to insert the insert member in any given orientation, so long as it is horizontally oriented to the slot in the ski joint which is designed to receive it.

In accordance with a further aspect of the invention, a small molded plastic tool is provided for readily ejecting the insert from the joint. This tool is generally E-shaped and has the dimensions of the interior faces of the E such as to straddle the edge of the ski while applying an ejecting force to the end of the insert by means of the central bar of the E which is thus guided against the insert. The entire arrangement of the ski joint in this embodiment of the invention is such that, should the E-shaped tool be unavailable at the moment, the insert may be ejected by the application of force against one end by means of any suitable implement, such as a screwdriver, a key, a coin, or the like.

One application of arrangements in accordance with the invention from which particular benefit may be realized is in a pair of skis with one or two joints preferably provided in each ski. The resultant sectioned skis each comprise two or three sections of no more than three or four feet in length, thus being much easier to handle and transport when disassembled than the present full length skis which require special handling in transporting, such as mounting on the tops of automobiles and in special cases or cartons on airlines and other modes of public transportation. For use, the sections may be readily assembled by assembling the joints in the manner indicated herein. When assembled, the joint is virtually unnoticeable because all components are self-contained and the outer surfaces are flush and smooth without any protrusions or recesses. Moreover the joint is as strong or stronger than the adjacent sections of the ski by virtue of its construction in accordance with the invention and the material employed in the insert. I prefer to use an insert of titanium or titanium alloy which provides ample strength in a very thin plate, thus permitting use of my joints in standard dimensioned skis without any need for thickening the ski to accommodate the joint. As a consequence of the novel construction of embodiments of my invention, the assembled unit functions in the same manner and with the same characteristics of performance as a full length, unsectioned unit. The cost of sectioned skis employing my invention does not greatly exceed that of standard, good quality skis and is well worth incurring for the great convenience of being able to disassemble the skis and transport them in compact form.

Although the invention is described in the context of utilization in sectioned skis, it will be understood that the invention may be used in other devices to provide similar benefits. Accordingly the scope of my invention is not limited to use with skis. For example, with the advent of shorter surfboards, it becomes feasible by means of the joint members of my invention to provide bifurcated surfboards which may be disassembled for transporting as luggage in conventional fashion.

A better understanding of the invention, both as to its construction and mode of operation, may be gained from a consideration of the following detailed description, taken in conjunction with the accompanying drawings, in which like referenced numerals designate like parts throughout the figures.

BRIEF DESCRIPTION OF THE DRAWINGS

FIG. 1 is an exploded perspective view of a preferred embodiment of a pair of members which are to be interconnected in accordance with the principles of the invention;

FIG. 2 is a plan view of the members of FIG. 1 assembled;

FIG. 3 is a side elevation of the interconnected members of FIG. 2;

FIG. 4 is a plan view of an alternative arrangement for interlocking the interconnected members of FIGS. 1-3;

FIG. 5 is a plan view of yet another arrangement for interlocking the interconnected members of FIGS. 1-3;

DESCRIPTION OF THE PREFERRED EMBODIMENT

Figure 6:
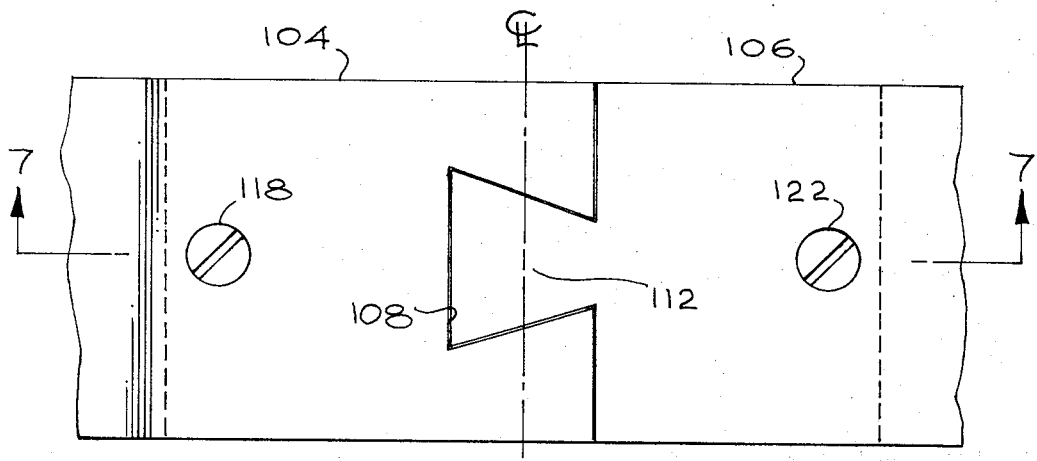
FIG. 6 is a plan view like FIG. 2 but showing an alternative arrangement for securing an insert to the interlocking members of FIG. 1.

Referring now to the drawings, there is shown in FIGS. 1-3 a preferred embodiment in an exploded view of the joint made in accordance with the principles of the invention. The assembled joint of FIGS. 1-3 is illustrated as part of an extended longitudinal member 10, such as a ski, the end portions beyond the joint being broken away for convenience of illustration. A first planar member 12 is configured for interconnection to a second planar member 14. An insert member 16 is adapted to be secured within the members 12 and 14 by means of fasteners 18.

In FIGS. 2 and 3 there is shown the joint member of FIG. 1 assembled in a top plan and side view, respectively. The first planar member 12 contains a slot 22 centrally formed in the plane of the member 12. In this embodiment the slot 22 extends across the entire width of the member 12. Lengthwise, the slot extends from a shoulder surface 24 to the end surface 26 of the planar member.

A trapezoidally shaped key way 25 is formed in the member 12 from a minor base formed in the surface 26 and extending rearwardly to a major base surface 28 formed in the member 12 in a plane generally parallel to the plane of the shoulder 24 and surface 26.

A pair of threaded openings 32 are formed in each side wall of the member 12 adjacent the shoulder 24 and extend into the slotted portion 22. The openings 32 allow the fasteners 18 to be threaded therein.

The planar member 14 has basically similar cross-section as the member 12. The member 14 contains a slot 42 which terminates at a shoulder 44 and extends to the end surface 46 of the member 14. A trapezoidally shaped key member 48 extends forward from the surface 46 and is slightly smaller than the key way 25 formed in the member 12. The key member 48 is such that it may be inserted into the key slot 23 transverse to the planes of the member 12 and 14 when the surfaces 26 and 46 are adjacent each other. Further, threaded openings 52 are formed in the side walls of the member 14 adjacent the shoulder 44, with the openings extending into the slot 42 in a similar manner as the openings 32 formed in the member 12.

Typically, the members 12 and 14 may be skis made of either wood or aluminum. Normally, skis are six feet and longer in length. By providing a pair of joined sections, skis can be transported in a less cumbersome size. However, it should be understood that the joint depicted in accordance with the principles of the invention is not restricted to skis and could be used when large sections of enlongated planar members must be joined together so as to avoid the necessity of tranpsorting the members in unusually large lengths. Also, as will further be described, the joint may provide a support which can withstand greater forces at the joint perpendicular to the plane of the members than if no joint were present.

After the members 12 and 14 are joined together, as previously described, the insert 16 is transversely inserted into the slots 22 and 42. The insert 16 has a width equal to the width of the members 12 and 14. The height of the insert is slightly less than the height of the slots so that if fits snugly into the slot. Further, the length of the insert is such that it also fits snugly between the shoulders 24 and 44.

Threaded portions 62 and 64 formed near the ends of the insert form continuations of the threaded portions 32 and 52, respectively. After the insert 16 is fitted into the slots 24 and 42, the fasteners are fitted into the opening formed by portion 32 and 62, as well as portion 52 and 64. The fasteners prevent the insert 16 from moving edgewise within the slots 22 and 42. Alternatively, it should be understood that the embodiments of FIGS. 1–3 may utilize only two fasteners to secure the insert at the joints, with both fasteners being used only on one side of the insert or on one end of the insert.

Typically, the insert 16 is made of a material having greater strength than the portions 12 and 14. For example, with the members 12 and 14 made of aluminum, the insert would typically be made of titanium. Moreover, it should be noted that the fastener 18 outer surface heads are flush with the sides of the members 12 and 14 and insert 16, thus providing a smooth surface. The keyway 25 and key member 48 prevent axial separation of the members 12 and 14. Finally, the insert 16 prevents deflection in the plane of the members 12 and 14.

Referring now to FIG. 4, there is shown an alternative arrangement for preventing axial movement of the two planar members. The planar member 66 contains a partially circular keyway 68 which terminates at the end surface 72 of the member 66. The planar member 74 has a key member 76 which is adapted to fit into the keyway 68 and is of a slightly smaller diameter than the keyway 68. The member 76 extends forward from the end surface 78 of the member 74. Once the member 76 is fit into the keyway 68, axial movement of the members 66 and 74 is inhibited. Of course, an insert can also be used with such an arrangements.

Referring now to FIG. 5, there is depicted still another embodiment for axially interlocking a pair of planar members 82 and 84. In FIG. 5 a plurality of trapezoidal keyways 86 similar to the keyway 25 are formed extending into the planar member 82 from its end surface 88. The keyways 86 are designed such that the spacing between adjacent keyways defines a key member 92. Similarly, the planar member 84 contains a plurality of keyways 94 which define key members 96 between adjacent keyways. When the members 82 and 84 are joined together the members 92 are fitted in the keyways 94, while key members 96 fit into the keyways 86.

Figure 7:
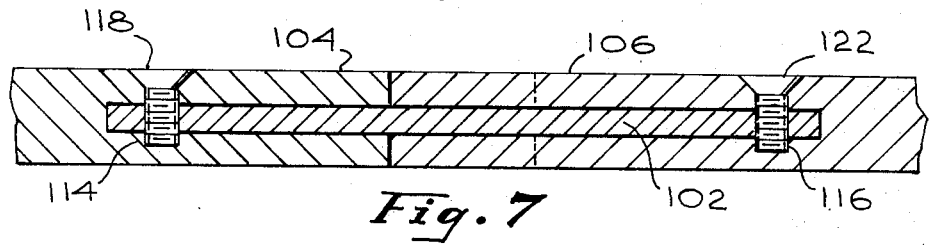
FIG. 7 is a side view, in section, of the interlocking members of FIG. 6 taken along the line 7—7.

FIGS. 6 and 7 illustrate an alternative arrangement for securing an insert 102 between a pair of planar members 104 and 106. The members 104 and 106 are basically similar to that shown in FIG. 1 and contain a keyway 108 into which a key member 112 is inserted. A pair of threaded transverse openings 114, 116 are shown in the members 104 and 106 respectively, extending through the insert 102.

Figures 8, 9:
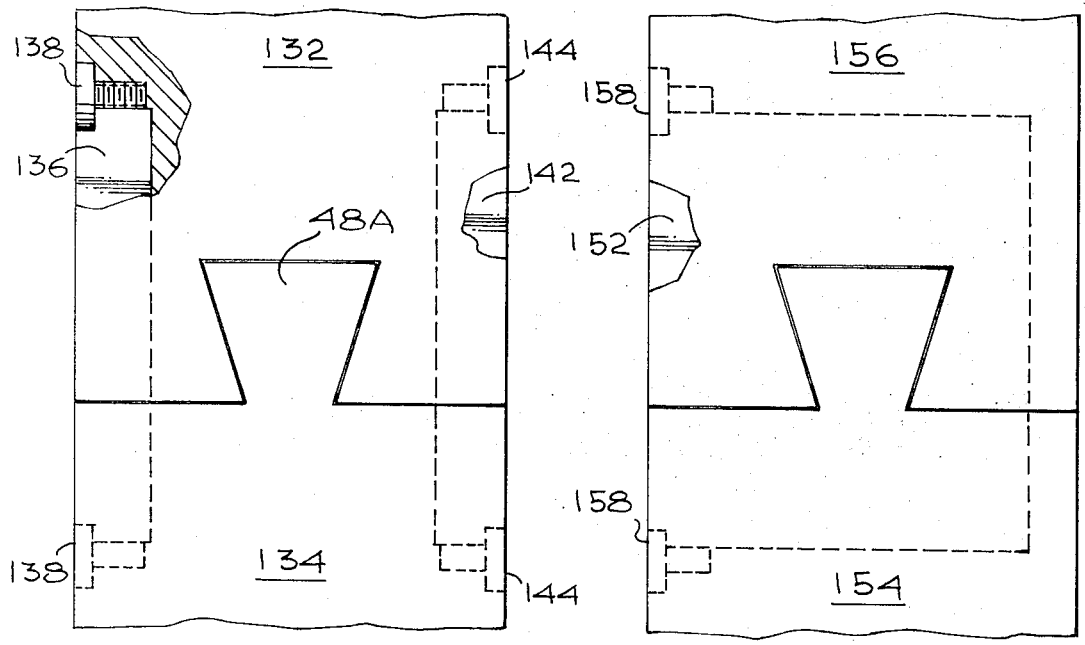
FIG. 8 illustrates an alternative arrangement of the insert.
FIG. 9 shows still another arrangement of the insert.

Referring now to FIG. 8, there is shown a plan view of an alternative arrangement for providing supporting inserts at the joint. The planar members 132, 134 are joined together with one insert 136 provided at one side of the joint and another insert 142 on the other side of the joint, the inserts being respectively secured to the planar members by fasteners 138 and 144. The embodiment of FIG. 8 eliminates the need for an insert extending across the entire width of the planar members and allows a lighter weight joint than the embodiment of FIGS. 1–3. In this embodiment the slot does not extend through the ski from side to side but rather comprises a pair of pockets at opposite edges of the ski. The tongue and groove configuration 48A extends all the way through the ski for greater strength against longitudinal separation.

In FIG. 9 an insert 152 is provided within a planar members 154, 156 and is secured therein by fasteners 158. The insert does not extend entirely across the width of the members 154, 156 but extends as far across as is necessary to provide the sufficient minimum support. In this arrangement the insert is received in a pocket extending inwardly as shown from the left-hand edge of the ski.

Figure 10:
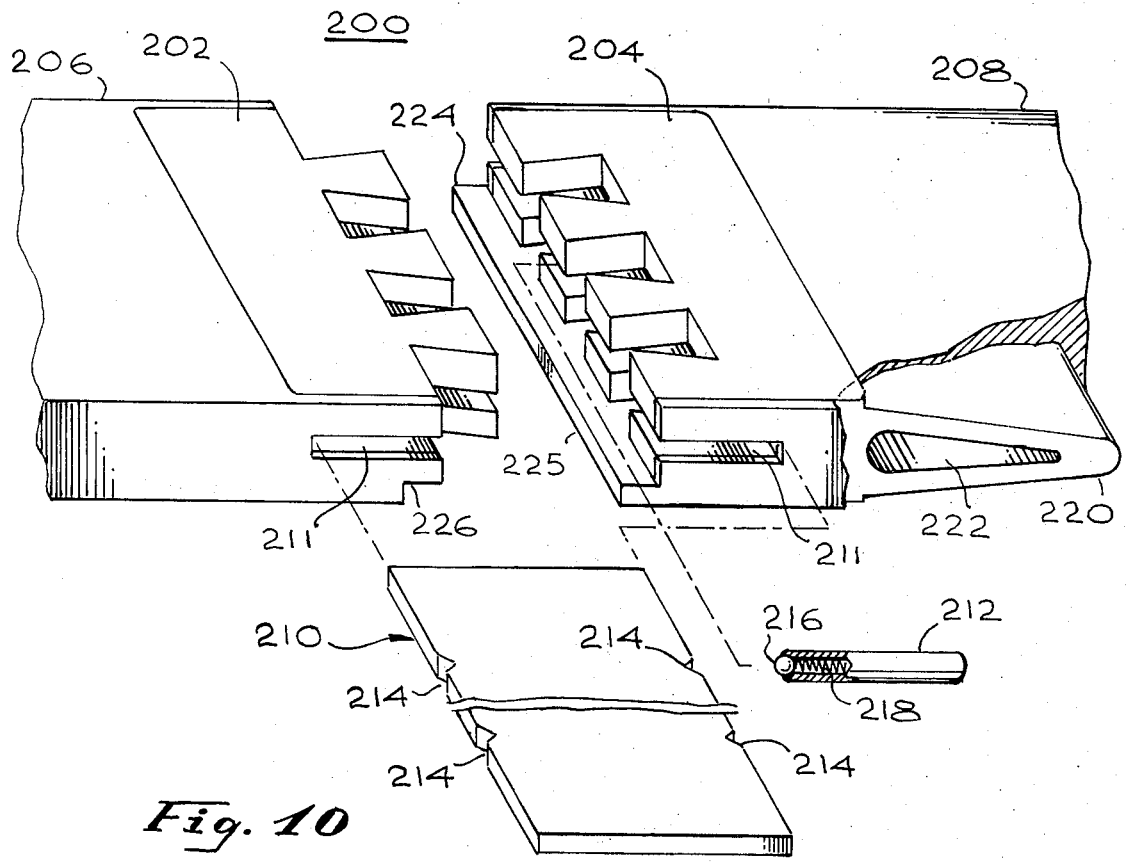
FIG. 10 is an exploded view, partially broken away, of yet another arrangement in accordance with the invention.
Figure 11:
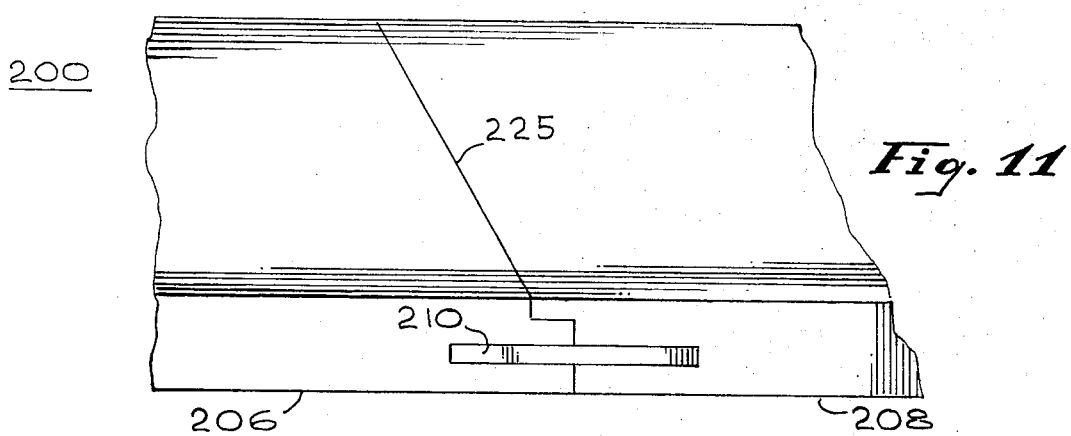
FIG. 11 is a perspective view showing the underside and one edge of a ski assembled with the joint arrangement of FIG. 10.

FIGS. 10 and 11 illustrate yet another embodiment of the invention. These figures shown an assembly 200 comprising joint members 202 and 204 set respectively in portions 206 and 208 of a member such as a ski. The assembly 200 also includes an insert 210 and at least one detent or retaining member 212. As seen in FIG. 10, each of the joint members 202, 204 is provided with a suitable dovetail arrangement adapted to join in interlocking fashion with the corresponding portion of the other by placing the two joint portions 202, 204 alongside each other and then moving them together transversely vertically so that the interlocking portions dovetail with each other. A slot 211 is provided in each of the members 202, 204 to receive the insert 210 which serves to fasten the members 202, 204 together and prevent their movement in the transverse vertical direction which is necessary to disassemble the two dovetail portions of the assembly 200. In turn, the insert 210 is retained within the dovetailed portions 202, 204 by means of the detent or retaining member 212 which is positioned in a recessed hole (not shown) in the member 204. The insert 210 is provided with four notches 214 so positioned that one of the notches will receive the protruding portion of the retaining member 212. The member 212 is a commercially available item in the form of a hollow pin having a ball 216 biased outwardly by a coiled spring 218.

The assembly 200 of FIGS. 10 and 11 is particularly designed for the modification of skis to provide a joint which is as nearly invisible as possible, particularly arranged so as to provide a surface of the bottom of the ski which is virtually uninterrupted, so that the user will be unable to discern any difference between a ski provided with such a joint configuration and a ski which is one integral member. Thus as may be seen in FIG. 10, with respect to the member 204, the joint members 202 and 204 are provided with an elongated tongue extension 220 which may be partially hollowed out as at 222 in order to lighten the weight of the joint members. In preparing the ends of the separate ski portions 206 and 208, the ends are hollowed out such that a slight overlap 224 is provided on the portion 208 to fit within a mating recess 226 on the portion 206. The portions 224, 226 may be squared off as shown, or they may have angled or bevelled overlapping edges if desired. In the latter case, with the lefthand edge 225 of overlap portion 224 sloping downward to the left, ski portion 208 would be the forward part of the ski. The edges of the ski portions 206 and 208 are undisturbed except for the provision of the slots 211. The respective mating portions 202, 204 are then set into the hollowed-out recesses in the portions 206, 208 respectively and securely fastened in place as by epoxy or suitable adhesive. FIG. 11 shows the edge and bottom of the ski portions 206 and 208 when joined in this fashion by the assembly 200. The entire joint is virtually invisible and unnoticeable, and only a very narrow line 225 extends across the bottom face of the ski, thus providing no discernible difference insofar as frictional engagement with the skiing surface is concerned.

When assembled in this fashion, the extended tongue 220 provides an improved base for receiving the screws or corresponding hardware which fasten ski bindings to the ski. Being of metal, the tongue 220 receives the sheet metal screws customarily employed for this purpose and holds them securely against pulling out.

Figure 12:
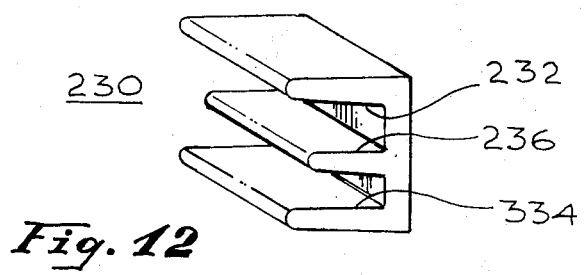
FIG. 12 is a perspective view of a particular implement designed for specific use with arrangements in accordance with the invention.

FIG. 12 illustrates an implement designed for use with arrangements in accordance with the present invention for ejecting the insert such as 210 in the arrangements of FIGS. 10 and 11 preparatory to disassembling the ski portions 206, 208. The implement 230 is generally E-shaped and is of a configuration such as to easily clip over the edge of the ski. Its interior surfaces 232 and 334 are dimensioned such as to engage the faces of the ski and each of the upper and lower bars defining the interior surfaces 232 and 334 are slightly inclined so as to guide the implement 230 onto the ski from the edge while the central bar portion 236 provides a blade bearing against the end of the insert 210 to partially eject it from the assembly 200. By means of the implement 230 used in the fashion described, the insert 210 is ejected far enough that the opposite end may be easily gripped and the insert may be pulled out of the assembly 200 preparatory to disassembling the ski. The implement 230 is preferably formed, as by molding, of plastic.

While the planar members have been previously described in one example as aluminum with a titanium insert, it should be understood that other materials could be used. For example, the planar members and insert could be made of various types of wood or wood and metal interchangeable. Alternatively, the members and insert could be formed of various types of synthetic materials such as molded plastic. Also, it is possible to utilize joining assemblies such as are described hereinabove without the provision of an insert or the slots to receive same. In such a case, another member for preventing relative transverse movement between the two portions of the joint assembly such as is necessary to disassemble the joint can be provided in one instance, for example, by threading a screw into a threaded hole drilled transversely of the ski within the joint members so that the screw when in position engages both of the interlocking joint members and prevents any relative movement between the two. Similar means such as retaining pins or wedges or the like may be employed for such purpose. Furthermore, although the mating keylock portions of the respective members of the joint assembly as described hereinabove have been shown in vertical alignment with each other, it will be understood that such is not a necessary requirement. For example, the upper and lower portions of the keylock arrangement may be longitudinally displaced from one another, still being arranged to engage one another upon assembly. In such a case, the insert may be dispensed with, the extended portions of the joint members between the respective keylock elements together serving to develop the desired rigidity of the joint. Any locking member as already described may be utilized to prevent disassembly of the interlocked portions until the locking member is removed.

Although there have been described above specific arrangements of joint apparatus for sectioned skis or the like in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined by the appended claims.

What is claimed is:

1. An interconnecting joint for connecting one end of a first planar section to one end of a second planar section, each of said section ends having generally similar cross-sectional dimensions at the interconnected ends, the joint comprising:

a channel formed in the plane of each of said sections intermediate the planar faces thereof extending from the said ends of said sections so as to divide each of said planar sections into a top portion and a bottom portion;
key lock means formed on the ends of said sections for interconnecting said sections at said section ends;
an insert releasably mounted in said channel; and
retaining means for coacting with and securing said insert to said sections for providing a generally rigid joint having the same cross-sectional dimension as each of the sections at the joint with no protruding portions, said retaining means being internally mounted in said channel in a position inaccessible from any outside surface of the joint.

2. An interconnecting joint in accordance with claim 1 wherein said insert extends across the entire width of said planar sections.

3. An interconnecting joint in accordance with claim 1 wherein said insert extends partially across the width of said planar sections.

4. An interconnecting joint in accordance with claim 1 wherein said key lock means comprises a trapezoidally-shaped key member which extends forwardly from said end of one of the planar sections and a keyway formed in said end of the other planar section, with said key member insertable in said keyway for preventing axial separation of said sections.

5. An interconnecting joint in accordance with claim 1 wherein said ends of said interconnecting joints are formed of a plurality of spaced apart keys and keyways for interlocking the ends of said joints.

6. Interconnection means for a pair of members having generally U-shaped portions to be joined together at the open end of the U's comprising:
cooperative lock means formed in each of said members for preventing axial separation of said members when joined together;
an insert providing transverse support for said joined members, said insert positioned in and substantially filling the U-shaped portions of said members; and retainer means for releasably locking the insert in place by engaging a portion of the insert internally of said members;
the formed lock means and the insert being configured to fit together smoothly and provide outer surfaces which are flush with the outer surfaces of said members, the retainer means being internally mounted within one U-shaped portion and inaccessible from any outside surface of the members.

7. An interconnecting joint for connecting one end of a first planar section to one end of a second planar section, each of said section ends having generally similar cross-sectional dimensions at the interconnected ends, the joint comprising:
keylock mating configurations formed on the ends of said sections for releasably interconnecting said sections at said section ends by sliding fit of one of said configurations relative to its mating configuration;
means mounted adjacent at least one of said sections for releasably interfering with the sliding of said mating configurations relative to each other in the direction of disassembly thereof; and
retainer means for removably securing said interfering means in place, said retainer means being internally mounted within the joint in a position inaccessible from any outside surface of the joint.

8. An interconnecting joint in accordance with claim 7 wherein said retaining means contacts the interfering means in the position of interfering with said sliding.

9. An interconnecting joint in accordance with claim 7 having an overlapping extension along at least one face of the first planar section to extend into and fill a recess in the corresponding face of the second planar section so as to partially conceal the keylock mating configurations.

10. An interconnecting joint in accordance with claim 7 wherein the keylock mating configurations comprise separate assemblies which are mounted within hollowed-out recesses in the ends of the first and second planar sections such that the keylock mating configurations are not visible along at least three sides of the joint.

11. An interconnecting joint in accordance with claim 8 wherein the interfering means comprises a slab insert adapted to be received within slot portions of the keylock mating configurations, the insert having at least one notch along an edge thereof which is concealed when the insert is assembled in the joint.

12. An interconnecting joint in accordance with claim 11 wherein the retaining means comprises a hollow member mounting an outwardly biased spring-loaded ball, the hollow member being positioned within one of the mating configurations opposite said notch when the insert is assembled in the joint.

13. An interconnecting joint in accordance with claim 12 wherein the insert has four notches positioned along two opposing edges thereof and so located that each may engage the spring-loaded ball for a corresponding orientation of the insert in the assembled joint.

14. An interconnecting joint in accordance with claim 13 wherein the insert is adapted to be ejected from the assembled position by the application of an E-shaped implement over the edge of the assembled sections at the location of the insert.

* * * * *